United States Patent
Kobres et al.

(10) Patent No.: US 9,473,747 B2
(45) Date of Patent: Oct. 18, 2016

(54) WHOLE STORE SCANNER (71) Applicants: Erick Christian Kobres, Lawrenceville, GA (US); Lyle Sandler, Morganville, NJ (US)

(72) Inventors: Erick Christian Kobres, Lawrenceville, GA (US); Lyle Sandler, Morganville, NJ (US)

(73) Assignee: NCR CORPORATION, Duluth, GA (US)

( * ) Notice: Subject to any disclaimer, the term of this patent is extended or adjusted under 35 U.S.C. 154(b) by 415 days.

(21) Appl. No.: 13/950,437

(22) Filed: Jul. 25, 2013

(65) Prior Publication Data

US 2015/0029339 A1 Jan. 29, 2015

(51) Int. Cl.
H04N 7/18 (2006.01)
G06Q 30/00 (2012.01)

(52) U.S. Cl.
CPC .............. H04N 7/181 (2013.01); G06Q 30/00 (2013.01)

(58) Field of Classification Search
CPC ................................................. G06Q 30/0623
USPC ......................................................... 348/150
See application file for complete search history.

(56) References Cited

U.S. PATENT DOCUMENTS

| 6,442,530 | B1 | 8/2002 | Miller | |
|---|---|---|---|---|
| 2006/0032915 | A1* | 2/2006 | Schwartz | G06Q 20/208 235/383 |
| 2008/0011836 | A1* | 1/2008 | Adema | G06Q 30/00 235/383 |
| 2011/0102588 | A1* | 5/2011 | Trundle | G08B 13/196 348/143 |
| 2012/0284132 | A1* | 11/2012 | Kim | G07G 1/0081 705/20 |

* cited by examiner

*Primary Examiner* — Hung Dang
*Assistant Examiner* — Girumsew Wendmagegn
(74) *Attorney, Agent, or Firm* — Schwegman, Lundberg & Woessner (57) ABSTRACT

Video monitoring and tracking techniques are addressed to allow consumers to purchase items in a store with no need to checkout at a traditional checkout lane. A large number of cart check and shelf check cameras monitor additions to carts and removals from shelves along with knowledge of location and what is on a particular shelf are employed to analyze which products are selected for purchase. Customer analytic data, as well as, store inventory data are preferably also developed from the camera image data.

20 Claims, 8 Drawing Sheets

WHOLE STORE SCANNER

FIELD OF THE INVENTION

The present invention relates generally to improved video monitoring and tracking techniques, and more specifically to such techniques applied to allow consumers to purchase items in a store with no need to checkout at a traditional checkout lane.

BACKGROUND OF THE INVENTION

A traditional grocery shopping experience involves a customer taking a shopping cart or shopping basket near the entrance of a store, travelling through the store to items to be purchased and taking items from their locations on shelves, end caps and other product displays. Upon completion of the selection of items, the shopper proceeds to an assisted checkout or self-service checkout lane where bar codes are scanned on each item, prices are looked up in a price look-up (PLU) table by a point of sale (POS) terminal, and a bill is generated. Payment is then made. Items are bagged and a receipt is provided to the customer.

A variety of smart cart and smart shelf concepts have been proposed, but have not been widely adapted presumably as a result of considerations, such as high costs of implementation and the like. For example, various patents address cart arrangements where a customer scans a bar code on each item as it is added to or removed from a cart. Alternative sensing arrangements, such as RFID sensing, have also been proposed in this context. As an example of a smart shelf arrangement, various arrangements have been addressed where, as an item is removed from a shelf, the removal is sensed.

SUMMARY OF THE INVENTION

According to one aspect of the present invention, the scanning based POS checkout experience for retailers and shoppers is advantageously replaced. Additionally, any need for consumers to scan their purchases with a mobile or other scanning device is eliminated. Further, radio frequency identification (RFID) or other special item taggings are not necessary. Advantageously, all solution components are part of the store infrastructure, so no mobile device or special equipment on the carts is required. In one approach, dozens of low-cost cameras with processors are utilized to perform a combination of video shelf monitoring and video cart monitoring. Events within predetermined zones are analyzed with each camera preferably having a reduced scope of responsibility with reduced compute burden. Processing burden is advantageously spread across the large number of camera stations. Motion-triggered events are translated into messages processed by a central system which orchestrates events such as zone-to-zone handoff, and coordinates intelligence. The ability to maintain cart contents and flag uncertain or obscured activity is preferably provided, as is the ability to track detailed customer motion throughout the store for analytics regarding customer activity.

Additionally, shelf cameras track changes to shelves where items are added, removed or shuffled, as, for example, 1) when a customer takes a product from one shelf, changes his or her mind about a purchase and then leaves the item at the point of changing the decision rather than returning the item to where it belongs; 2) when a customer picks up a product from a shelf and then puts it back after looking at a label; 3) when inventory is added by store personnel; 4) when a vendor responsible for maintaining shelf space for a specific product, adds, removes or otherwise moves product; or the like. Items removed from a shelf in proximity to a cart can also be tracked. Overhead cart cameras track changes to cart contents such as adding, removing and shuffling. A consolidated view may be employed to provide real-time shelf inventory. A further consolidated view provides real-time contents of all carts in the store. Sanity check tracking of items at a wrap station can validate contents against expectations as addressed further below.

A more complete understanding of the present invention, as well as further features and advantages of the invention, will be apparent from the following Detailed Description and the accompanying drawings.

DETAILED DESCRIPTION OF THE DRAWINGS

Figure 1:
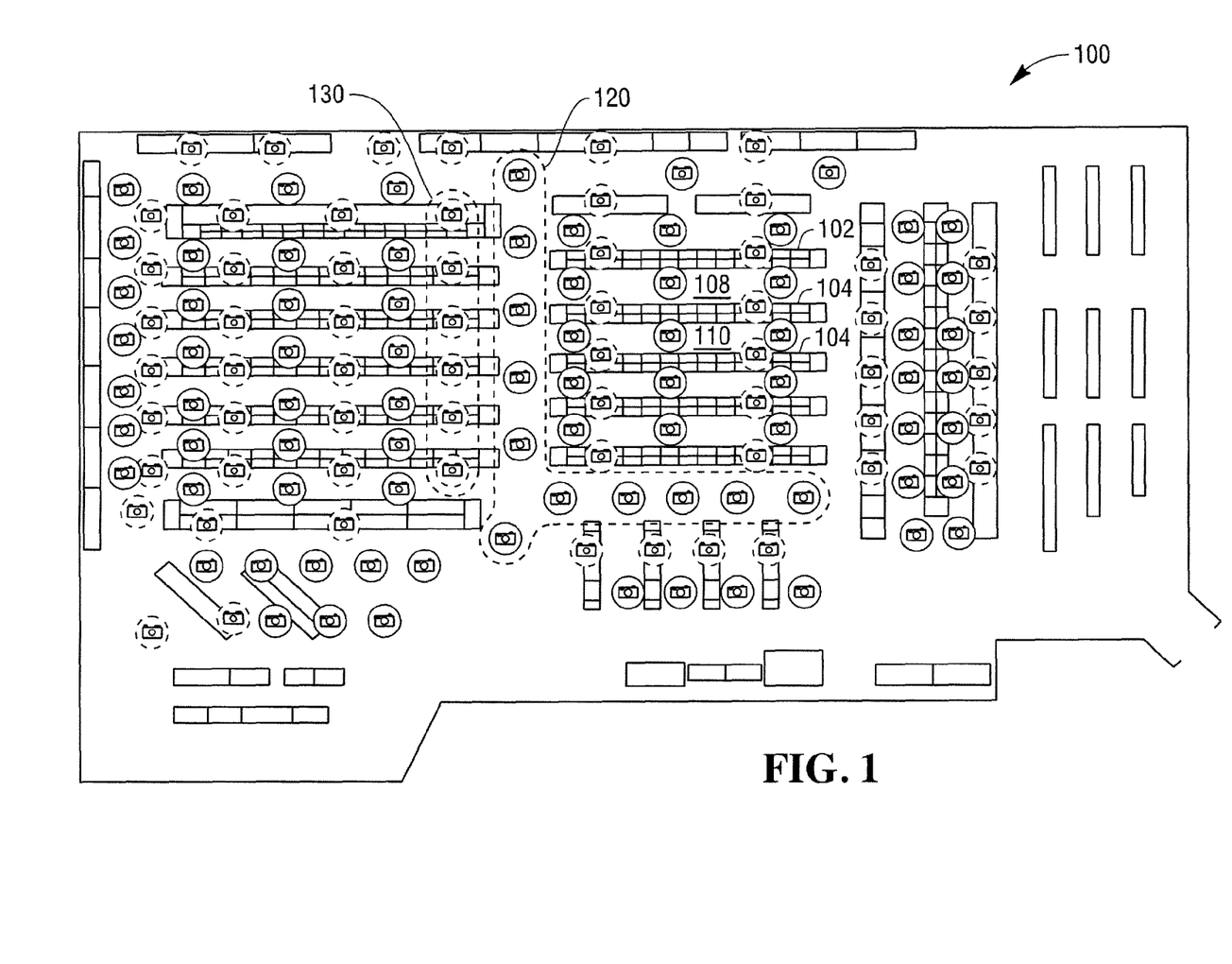
FIG. 1 shows an illustrative store layout with exemplary pervasive cart and shelf camera placement in accordance with the present invention.

FIG. 1 shows an illustrative store layout 100 in which goods to be purchased are arranged on a series of shelves, such as shelves 102, 104 and 106, for example, separated by aisles 108 and 110, for example. Other product displays other than shelves are typically employed, such as the dairy cases, frozen food cases and end cap displays found in the typical grocery store. As seen in FIG. 1, a pervasive array of cameras, including exemplary cart cameras 120 and shelf cameras 130 are employed. It will be recognized more or less cameras may be employed so long as sufficient cameras are provided to sufficiently track and monitor customer movements and product selections.

Figure 2:
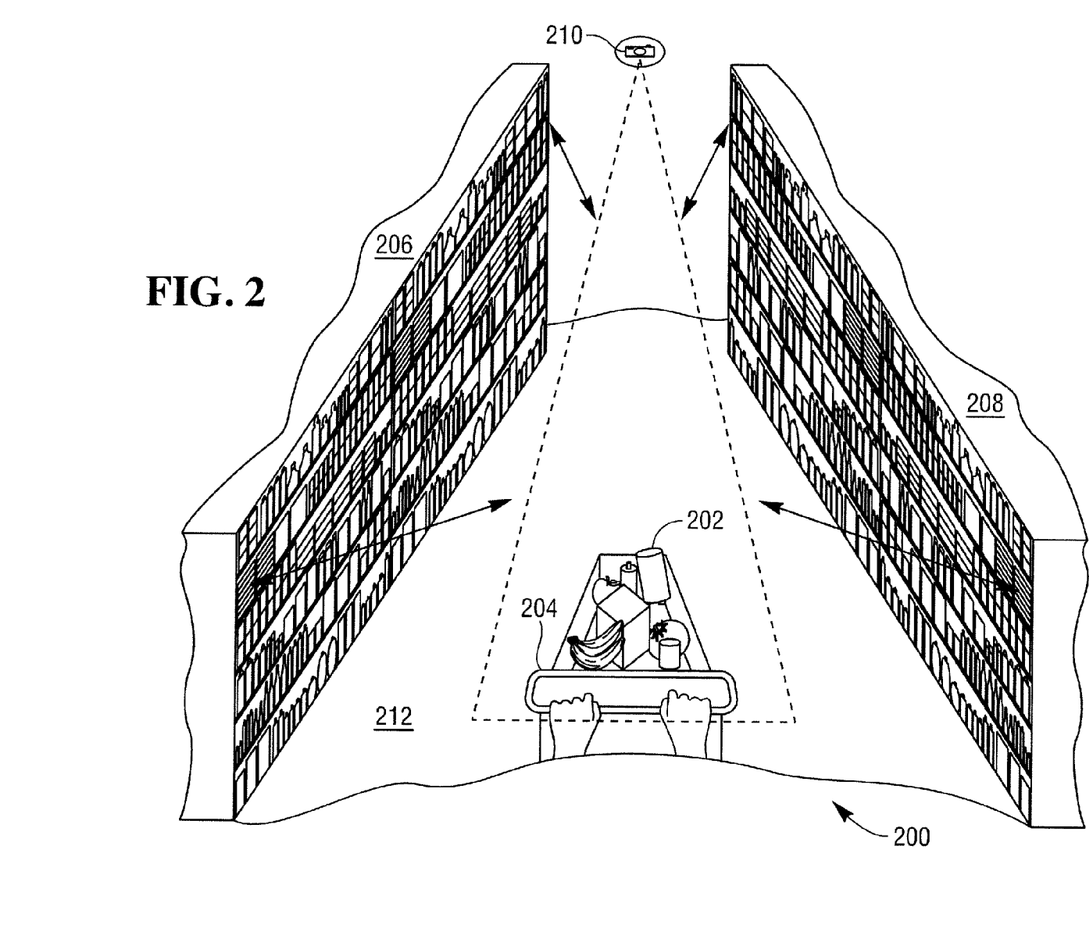
FIG. 2 shows an illustrative field of view of a cart camera.

FIG. 2 shows an illustrative field of view 200 of a cart camera 210 supported from a ceiling of a store, such as the store 100 of FIG. 1. Cart camera 210 is shown above shopping cart 202 within a zone between shelves 206 and 208 in the middle of an aisle 212. As discussed further below, a visual indicator 204 on the shopping cart 202 is detected by the cart camera 210 and utilized to associate image data for the shopping cart 202 with a particular identifier.

Figure 3:
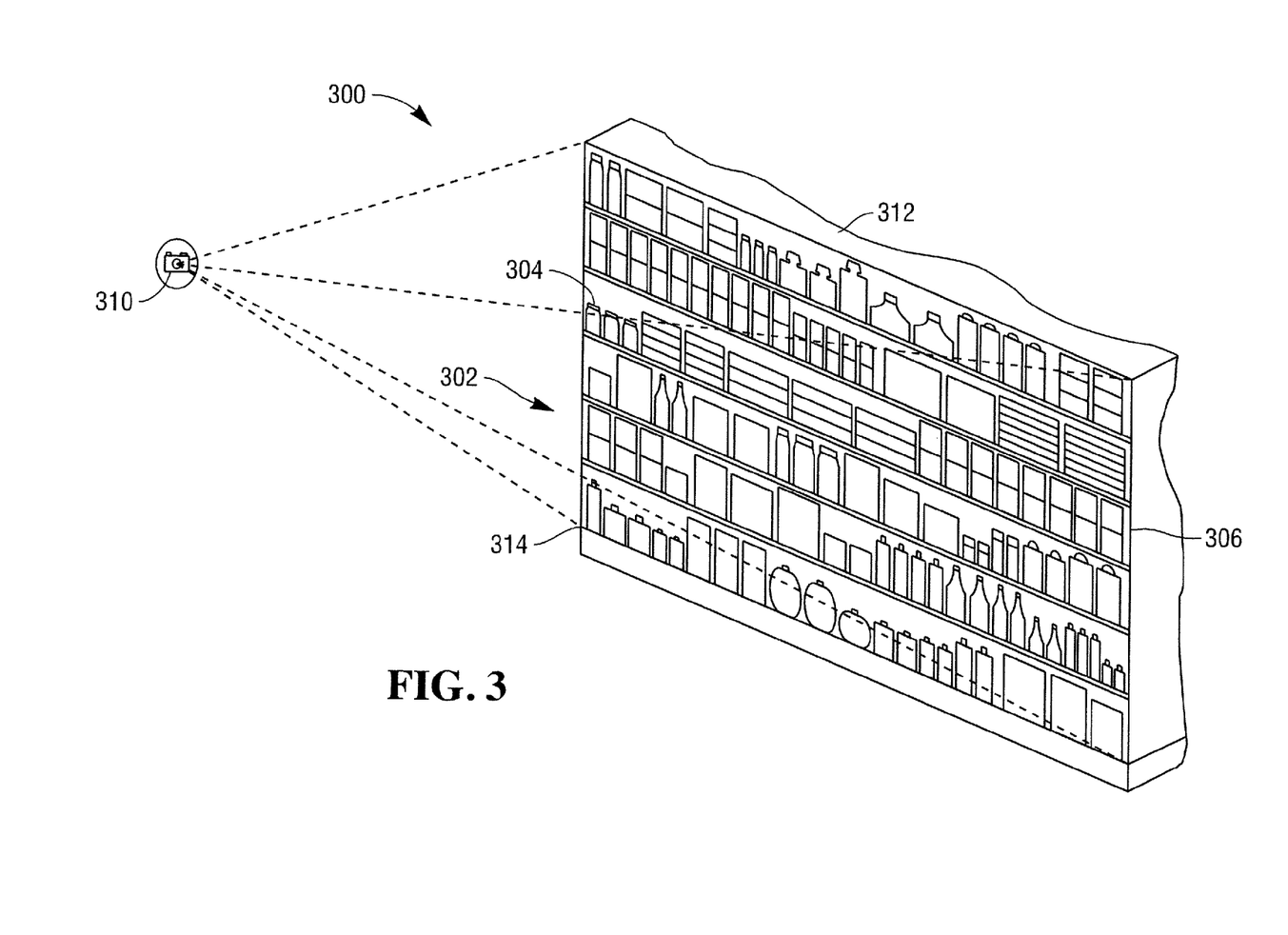
FIG. 3 shows an illustrative field of view of a shelf camera.

FIG. 3 shows an illustrative field of view for a shelf camera 300. As seen in FIG. 3, shelf camera 310 picks up a portion of shelf 302 supporting products. The field of view 300 extends from one end 304 to the other end 306 and from top 312 to bottom 314. Visual identifiers on shelves may be optionally employed if desired; however, it is presently preferred to use planogram data associating given store shelves with particular products, as addressed below.

Figure 4:
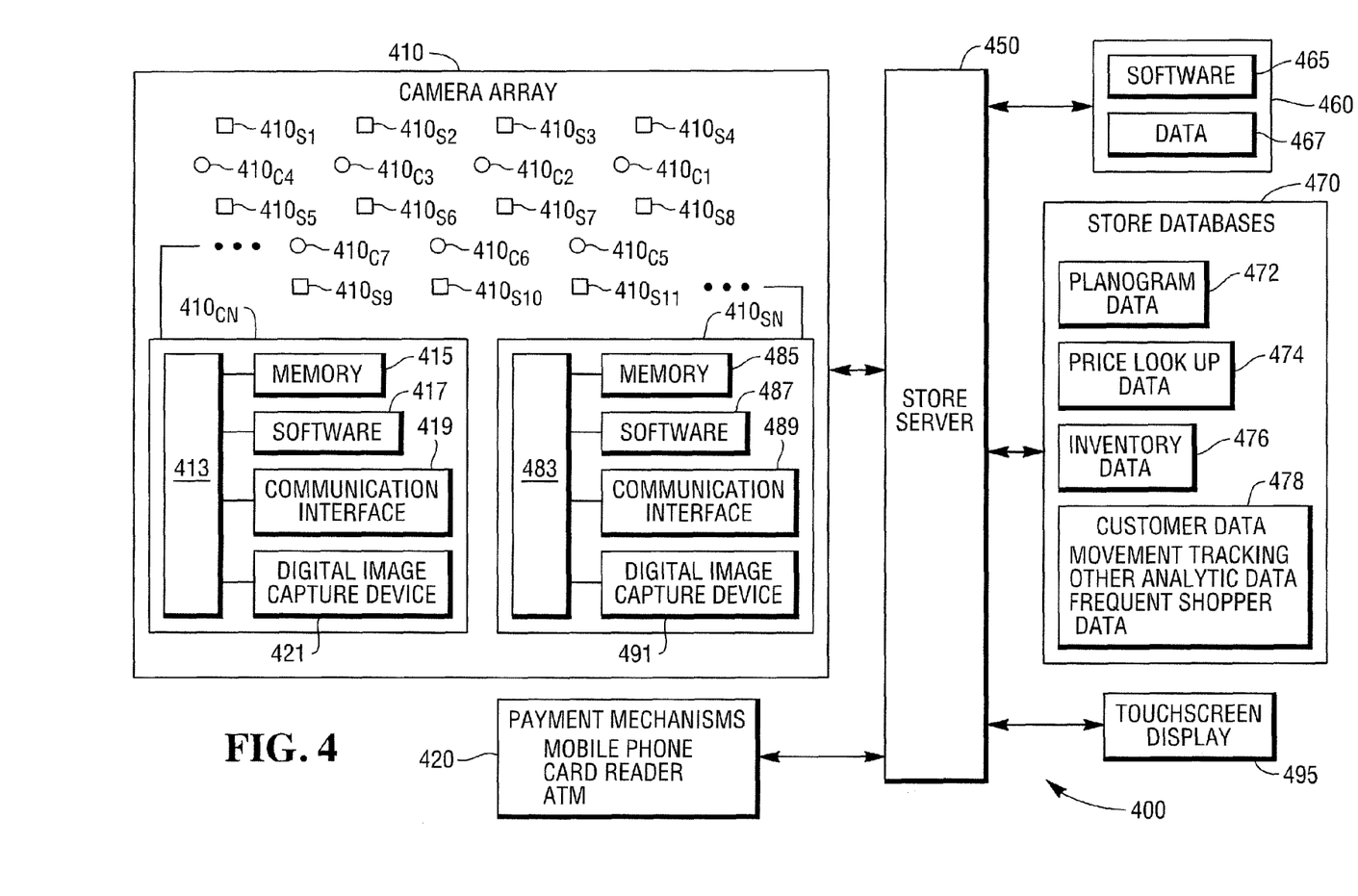
FIG. 4 shows a block diagram of a store processing system for use in conjunction with a pervasive camera arrangement in accordance with the present invention.

FIG. 4 shows a system 400 in accordance with an embodiment of the present invention employing an array of cameras including cart cameras $410_{c1}$ . . . $410_{cn}$ and shelf cameras $410_{s1}$ . . . $410_{sn}$ (collectively 410) to provide image and other data to a server 450. Plural payment devices 420, such as a mobile phone, card reader, ATM, or the like, provide payment information to the server 450. Server 450 runs store software 465 and employs data 467 stored in memory 460, as well as retrieving data from store databases 470 including planogram data 472, price look-up (PLU) data 474, inventory data 476, and customer data 478, such as movement tracking data, other analytical data, and frequent shopper data, and the like, as addressed further below.

As further shown in FIG. 4, each cart camera in the camera array 410 may suitably be embodied as shown for cart camera $410_{c1}$ by a combination of a processor 413, memory 415, software 417, a communications interface 419, and a digital image capture device 421. Memory 415 will preferably store a location identifier or a camera identifier associated with the camera location so that when the cart camera 411 utilizes its communications interface 419 to communicate with the server 450, the server 450 can immediately place digital image data forwarded therefrom in the overall framework in the store of the store system database 470 and the array of cameras 410. By connecting the dots, so to speak, the server 450 can track movement of a shopping cart and associated shopper throughout a store, such as the store 100.

In a presently preferred embodiment, the processing burden is partially distributed to the camera array 410 from the server so that the image data at a camera, such as the cart camera $410_{cn}$, is analyzed so that a cart identifier, such as cart identifier 204, is recognized by the processor 413 so that digital image data from the cart camera 411 is tagged with the cart identifier when transferred to the server 450.

It will be recognized that the components of the cart camera $410_{cn}$ closely parallel those of a cell phone so that higher quality camera components and fast processing can be economically acquired as a result of high phone demand for similar components bringing their price points down.

An example shelf camera $410_{sn}$ is also shown in FIG. 4. Shelf camera $410_{sn}$ may be embodied as a combination of a processor 483, memory 485, software 487, a communications interface 489, and digital imager 491. Memory 485 will preferably store a table of items on the shelf in the field of view of digital imager 491 in addition to a camera identifier associated with the location of shelf camera $410_{sn}$. The table will typically be downloaded from the server 450 which downloads it from planogram data 462 in database 460, and updates data as changes occur in the planogram data. As such, when shelf camera $410_{sn}$ detects a customer taking an item from the shelf, the software 487 can control the processor 483 to attempt to recognize the item from a small number of items associated with that shelf location. In a large display of twelve packs of Coke™, that number might be less than ten. In any case, the number will be substantially smaller than the large total number of items in the store, advantageously simplifying and speeding the recognition process.

In a presently preferred embodiment, the server 450 triggers reports from each cart camera and one or more associated shelf cameras in a sequence. For example, server 450 might associate cart camera $410_{c4}$ with shelf cameras $410_{s1}$ and $410_{s5}$, local thereto. To relate such cameras to a physical store layout, cart camera $410_{c4}$ might detect a shopping cart as it enters one end of an aisle, and shelf cameras $410_{s1}$ and $410_{s5}$ might have the shelves on either side of that end of the aisle in their field of view. In addition, when a cart camera or shelf camera detects a change, such as movement, a removal from a shelf, an addition to the cart, or the like, it informs the server 450 which can then focus more attention on particular ones of the cameras in the array 410.

While in the above discussion and subsequently herein, a camera is referred to as a cart camera or a shelf camera, it will be recognized that it will be possible and possibly desirable for certain camera angles and store environs, that a camera serve a dual function role as both a cart and shelf camera.

One important aspect of the present invention is the ability to track items based on recognition that there was a change to the static state of a shelf or other container of goods, such as a shopping cart. Rather than attempt to perform raw image recognition "unassisted", the system uses the context of the location, such as planogram information for an associated shelf camera for an associated cart camera, and the change to the "picture" of the items at rest to narrow the list of possible items and further assist with the recognition. Further, the invention then attempts to track the item and maintain a view of it throughout the remainder of the shopping trip, across multiple camera view zones and multiple angles.

This approach involves mapping the customer, the customer's shopping cart or basket, and the view of visible items as the customer moves through the store. To this end, an image of a customer and an associated empty basket or shopping cart is acquired when the customer first begins shopping. Synchronization of multiple views is employed as the customer and the items selected by the customer as they move through the store. Assumptions about what has likely not changed versus what has changed are also advantageously utilized. For example, once an item is added to a cart or basket, the relatively static image of the contents of the basket or cart will not change unless the customer adds, removes, or rearranges the item or items. So as long as the view remains relatively unchanged, the system can assume the same items are in the basket or cart. Only when something visibly changes does the system need to attempt to interpret what has happened. In other words, has an item been added, removed, or rearranged?

This approach is somewhat analogous in nature to tracking a face using software to track a person's movement through a venue or on a street. Law enforcement and investigators use this type of software today to search a crowd for wanted people, or to establish the path of a particular individual from closed circuit television (CCTV) footage. The present approach tracks a basket or cart of goods and looks for changes to it as well as tracking the person and the cart, as well as, monitoring shelf or other display inventory.

As addressed in greater detail herein, the present invention departs from simple person tracking by additionally considering the following things not typically addressed by face tracking software:

1. The customer or customers and their association with a cart and some array of goods.

2. The container (cart or basket) which itself can be identified through a marker, tag, or the like. The container will not change, but it is a target that will contain an interesting region of focus for analysis, and provides a basis for prioritizing data from the camera's much larger field of view to focus on the contents.

3. The store goods at rest in their stocked locations. These images are subject to change as customers and store employees remove, rearrange or add items to or from a shelf. However, the basic plan of their layout is stored in planogram data which is leveraged by the present invention to great advantage.

4. The contents of the container—which is a delta of the expected image of a known empty container, like a standard shopping cart or shopping basket.

5. The relationship of the previous four things with one-another and their relative locations, and their relative location to the rest of the store.

By construing where the customer begins shopping and first becomes associated with a tagged shopping cart or basket, the system knows where the customer is at the start, when the customer is holding or manipulating an item, which container is theirs, where the container is, when the container contains items, when the contents of the container change, and when the contents of a shelf change, for example. It is also known what possible movements can be made from any particular point so a limited number of handoff cameras need to be checked when any camera detects a customer is leaving its field of view. For example, if cart camera $410_{c3}$ is located in an aisle between two long rows of shelves and it detects a shopping cart, the shopping cart can stay at $410_{c3}$ or move to $410_{c2}$ or $410_{c4}$. No other moves are possible.

It can also be readily determined, by combining knowledge of where the customer is, shelf change data, container change data and the like, that a high likelihood product recognition can occur without having to visually recognize the product out of the thousands of products in a typical large box store.

These tactics, though somewhat computer-intensive by today's standards, greatly reduce the computational burden of the system in trying to track a customer and a number of items throughout the store. The advent of cheap graphical processing units (GPUs) and cameras, and faster networks makes the problem solvable by mainstream computing technology as further addressed herein.

Additionally, where an inconclusive recognition results, image data may be provided by server 450 to display 495 for review by store personnel. While one display is shown as exemplary, it will be recognized that multiple displays may be typical.

As discussed further below, FIGS. 5A-5D show an example process 500 for providing a pervasive video monitoring and tracking solution in accordance with the present invention. In step 502, a shopper enters a store such as store 100 of FIG. 1 and selects a shopping cart or basket, such as shopping cart 202 of FIG. 2. Throughout the remainder of this example, it is assumed the shopper selected a shopping cart, but discussion relevant to the cart is also relevant to the basket or other shopping customers as appropriate. In a presently preferred embodiment, the shopping cart has unique visual identification marks to aid in tracking, such as the mark 204 of FIG. 2.

Figure 5A:
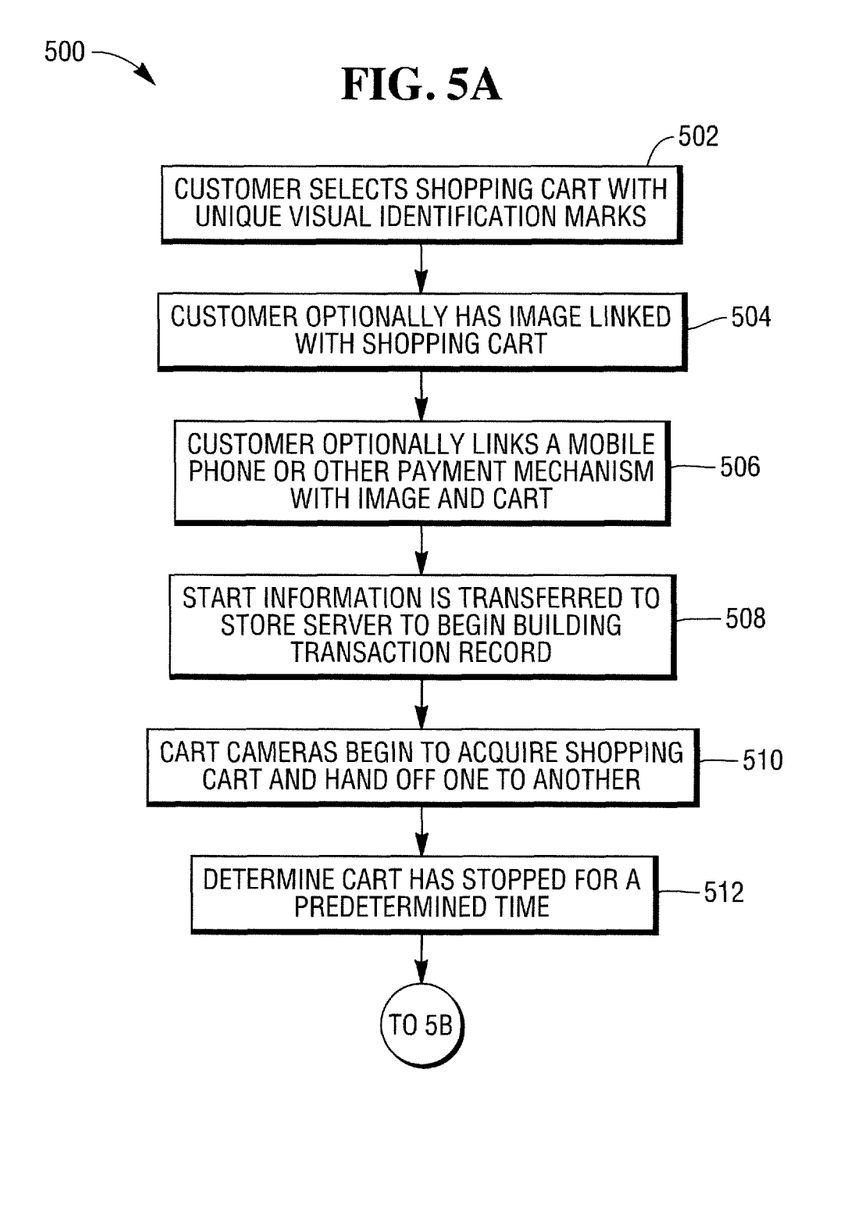
FIGS. 5A-5D show an illustrative process of pervasive camera monitoring in accordance with the present invention.

In one embodiment, a memory of an individual camera, such as memory 415 of cart camera $410_{cn}$ of FIG. 4, stores a table of shopping cart identifier marks. Optionally, at step 504, the shopper stands on a mark facing a first camera and has his or her image linked with the selected cart. In a further optional step 506 to facilitate a speedier checkout process, the shopper links a mobile phone or other payment mechanism with the image and the cart before beginning shopping. As another example, a customer may insert a debit card into a card reader and authorize the transaction by entering a personal identification number. While these activities are shown near the start of the process 500, to enable linking of further customer data to the transaction record up front, it will be recognized payment may occur at the end of the transaction as is currently typical.

In step 508, the starting information such as cart identifier, shopper image and payment confirmation data is transferred to a store server, such as server 450 of FIG. 4 which begins to build a transaction record. The shopper then proceeds to the location in the store of a first item.

In step 510, a first cart camera acquires the shopping cart in its digital image data and hands the cart off to a second, a third and so on until the shopper and the cart reach the first item. As part of this process, digital image data from each cart camera, as well as digital image data from shelf cameras near and associated with each cart camera is evaluated to determine if an item has been removed from a shelf near the shopping cart or if an item has been detected as added to the shopping cart. As in the example, the shopper is simply wheeling the shopping cart to the first item, no such changes are noted.

Figure 5B:
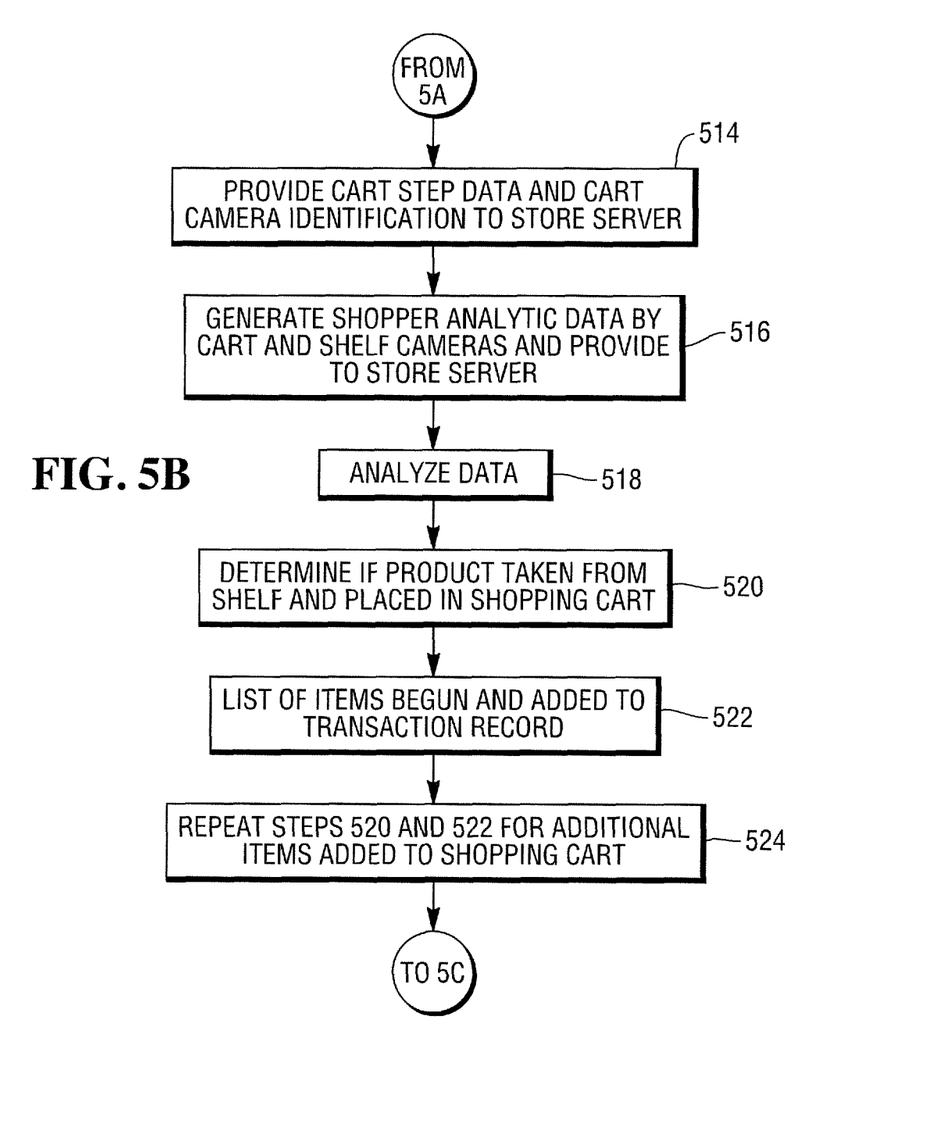

Proceeding with the example, it is next assumed that the shopper reaches a first item. As such, the shopping cart is stopped and in step 512, the processor of a cart camera near the first item determines that image data including the shopping cart can be evaluated to determine if the shopping cart has stopped for at least a predetermined time. In step 514, this determination and an identifier for the cart camera are provided to the store server which stores planogram data 472 as shown in FIG. 4. This planogram data advantageously includes the location of all of the cart and shelf cameras, the location of the products in the store, and the correlation of the camera and location data. It will be recognized that a full range of planogram services may be provided. For example, directions to products may be provided to customers, store maps may be generated, and the like as described in U.S. Pat. No. 6,442,530, assigned to the assignee of the present application, and incorporated by reference herein in its entirety.

In addition to determining what items are placed in the shopping cart and facilitating checkout, the present invention advantageously supports collection and evaluation of a full range of shopper analytic data, such as how long a customer stopped to view a product, what products were picked up and then put back down, and the like are also generated and analyzed. In step 516, the shelf cameras local to the cart camera are determined; shopper data is generated by the cart and shelf cameras and provided to a store server, such as store server 450 which in step 518 employs data analysis software to analyze the data. While the single pair of steps 516 and 518 are shown, it will be recognized that the generation, collection and analysis of such data can and preferably is an ongoing process conducted throughout the shopper's time in the store.

In step 520, the image data from the cart and shelf cameras is analyzed by those cameras or the server to determine that the shopper has taken product from the shelf and placed it in the shopping cart. In a presently preferred embodiment, such analysis takes into effect changing image data recognized as a product being removed from the shelf followed by the detection of changing image data recognizing the addition of the product to the shopping cart. In addition, the location on the shelf that the product came from is known and the recognition of the product taken from the shelf can be based both on the location and the image data substantially reducing the complexity of the image recognition process. In some cases, the location on the shelf may be definitive such as where the customer takes a twelve pack of soda from a large Coke™ display, but in every case the recognition process is greatly simplified as the location limits the recognition process to recognizing an item as one of a small number of items rather than one out of thousands.

Figure 5C:
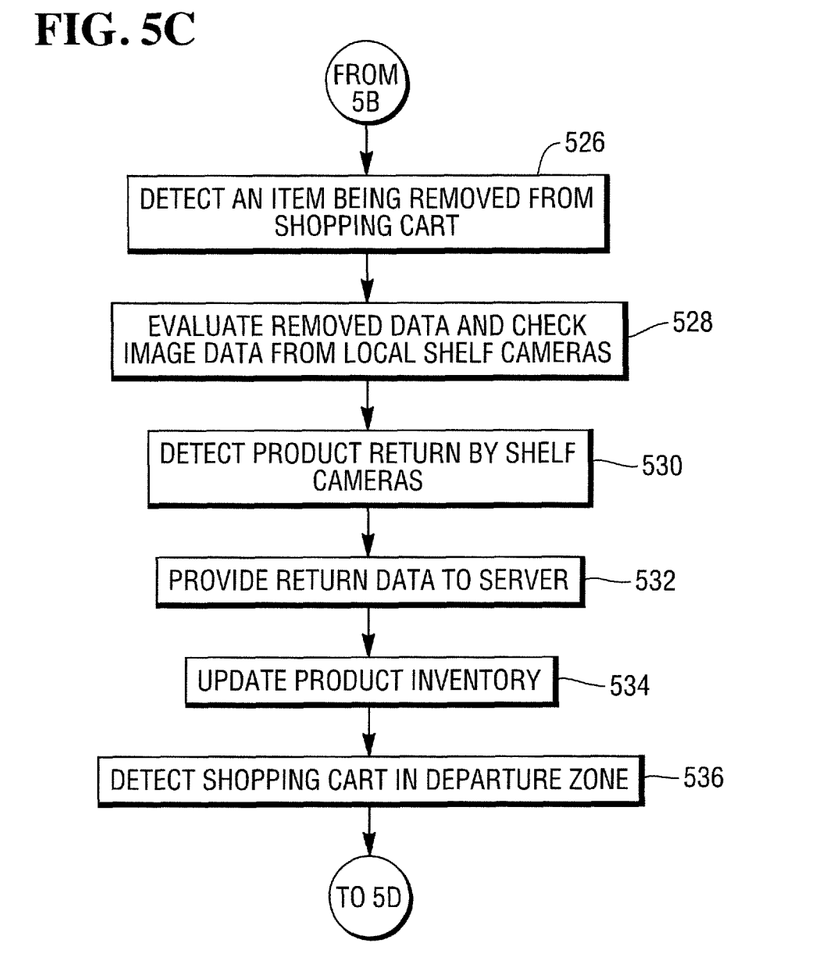

In step 522, a list of items in the shopping cart is begun and associated with the transaction record including the shopping cart and shopper information. In step 524, the process continues by repeating steps 518 and 520 as the shopper adds items to the shopping cart.

Where an item cannot be identified with a sufficient degree of certainty, digital image data can be provided by store server 450 to a display 495 which is monitored by a store employee. If the store employee can recognize the item from the digital image data, the store employee can resolve the ambiguity by entering the item data. If not, the store employee can flag the ambiguous item for review prior to the customer leaving the store. Any relevant information, such as the location in the store where the unknown item was selected and a list of possible items matched to the flagged data to speed further review at a manual check by store personnel performed prior to the customer leaving the store. In the event a shopper seeks to return an item to the shelf, in step 526, the cart camera detects an item being removed. In step 528, the server evaluates the removal data and checks image data from the shelf cameras local to the cart camera. In step 530, one of the shelf cameras detects a product return. In step 532, the return data is provided to the server which updates the product inventory to reflect the return in step 534. Either the shelf camera or the server may determine which product has been returned.

Upon completion of shopping, the shopper takes the shopping cart to a departure or wrapping zone. In step 536, one or more cart cameras detect the shopping cart in a departure area. In step 538, image data for the shopping cart and an indication of location of the shopping cart in the departure area is provided to the store server.

Figure 5D:
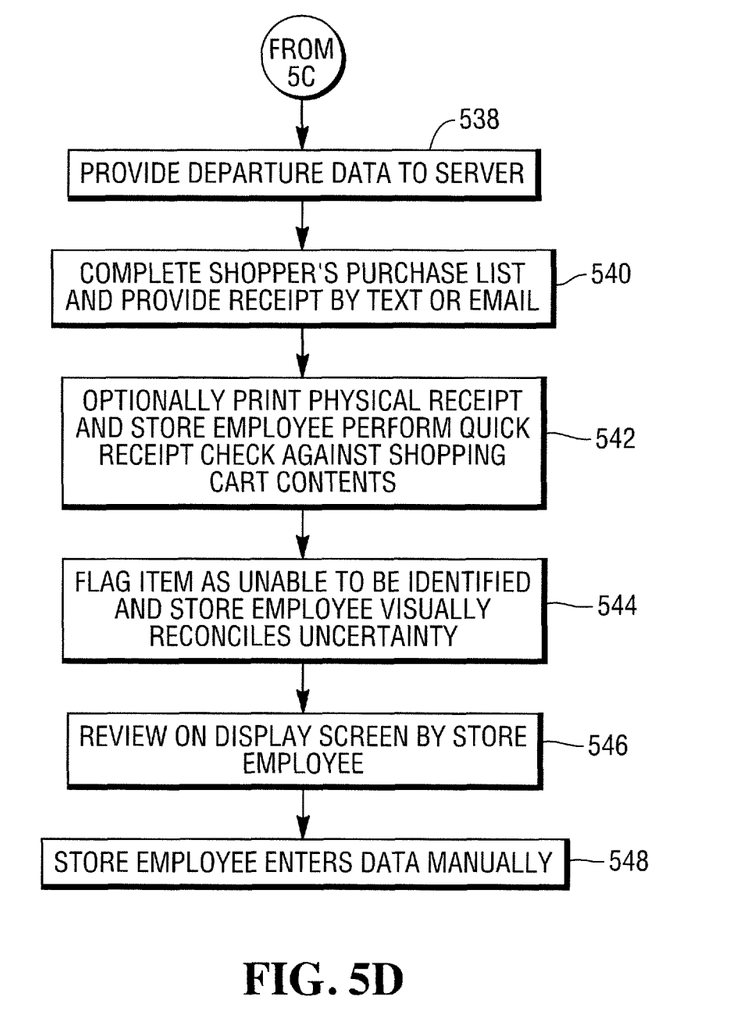

In step 540, the store server completes the shopper's purchase list, authorizes payment and provides a receipt by text or email. The shopper may choose to bag, box and or otherwise wrap up the items purchased in the wrapping zone, and then take the purchases from the store.

In an optional step 542, a receipt is printed and a store employee may quickly perform a receipt check of the contents of the customer's shopping cart. This check can be on a random basis, flagged based upon a questionable activity flagged by the system, correlated with an evaluation of a frequent shopper determined to be buying items not typically purchased, or everyone's cart can be quickly visually checked, or the like.

In a further optional step 544, at some point prior to departure, the system flags one or more items as unable to be identified with sufficient certainty and a store employee near the departure area is alerted to visually reconcile any uncertainty. A video image of uncertain activity can be reviewed on a display screen in step 546. One or more store employees may have the job of manually entering data in step 548 for an item flagged as uncertain. If the ambiguity can be resolved prior to completion of shopping, the shopper can leave without being delayed.

While the process 500 shows a particular order of steps consistent with the illustrative example, it will be recognized aspects of the invention enable a true scanless solution for consumers and retailers both. With these approaches, it is possible to revolutionize the checkout process for retailers and consumers. To summarize, the process can be as simple as placing items in a cart, picking up an electronic or paper receipt, and leaving the store. All components are preferably hard-wired into the store infrastructure. There is no need for retailer or consumer mobile devices to scan products. No "smart carts" are needed to charge or suffer damage/vandalism. However, the invention is able to integrate with mobile self-service checkout for consumer itemization and payment. It is also able to integrate with existing self-service checkout (SSCO) business logic for interventions such as alcohol, items to be weighed, reconciliation of uncertainty, and the like. It is also able to provide accurate store location data for consumers as they look for items contained on their mobile SSCO list. It is able to provide accurate location data when consumers need assistance. It is further able to provide extensive analytics to retailers on traffic patterns, dwell time, and the like. It can be readily integrated with or replace traditional in-store video security. Further, the system can notify staff of attempts to shoplift, showing a video clip of suspicious activity.

While the present invention has been described in the context of a present embodiment, it will be recognized that it can be adapted and modified as technology advances and to adapt to varied contexts consistent consistently with the claims which follow below. More particularly, at steps 514-520, the example described assumes the customer stopped the cart, took an item from the shelf, placed it in the cart and continued to shop in a normal manner. However, it will be recognized in some small number of instances, a customer fills or partially fills a cart and then abandons it for some reason. Where frozen items or items requiring cooling to remain fresh are involved, such behavior is a real problem for stores. It will be recognized the present invention can be readily adapted to encompass such issues. For example, if in step 512, or at any time, the processor of a cart camera detects the cart has stopped for an unacceptably long predetermined time, store personnel can be informed and provided with the location of the cart so frozen items and the like can be restored to their correct environments. Digital video images can be provided to store personnel on the touchscreen display 495.

Similarly, where a customer abandons an item on the wrong shelf, digital image analysis may recognize such actions and alert store personnel so the item may be reshelved properly. Where ambiguity is detected, store personnel can be alerted and the digital image reviewed on the touchscreen display 495.

Suspicious activity can be identified and addressed. For example, where a shelf camera detects an item taken from the shelf, but no cart camera detects the item being placed in a nearby cart, the digital image data from the nearby cameras can be analyzed by the server, flagged if necessary for store personnel review, and reviewed thereby.

Additionally, the present invention can be leveraged to provide real time feedback to customers by directing relevant real time offers to a customer's mobile device based on an evaluation of customer activity. For example, if a customer dwells at a display of drinks or buys a sequence of items suited to a party or tailgating, coupons for complementary items such as chips, nuts or the like may be transmitted. If a vendor has a buy two related items promotion ongoing, a text can be sent saying "Did you know if you buy Fritos™ and Pepsi™ you can save $1.00?", for example. As another example, a customer can be informed of buy one, get one free offers while at or near a shelf rather than learning about the offer at the checkout line and either potentially losing out or having to halt the checkout process and to rush back to the shelves as might typically occur now.

Digital image data flagged for suspicious activity may be stored for evidence to be used by local police and prosecutors in a possible prosecution for shoplifting or employee theft as the camera array provides a mechanism for watching employees as they stock shelves to both confirm that items are correctly shelved and those items actually make it to the shelves. Digital image data can provide a source for resolving employee disputes about who is responsible for a poor job of product facing or the like, and for store supervisory personnel for providing employee feedback.

From the above, it will be recognized the approaches of the present invention while disclosed in a presently preferred context can be leveraged to address a very wide array of store issues so that system costs can be spread across a large number of retail store operational improvements.

We claim:

1. A store camera system comprising:
   a first camera generating digital image data for a first shopping container;
   a second camera generating digital image data for a first product arranged on a product display in response to a motion trigger by a customer handling the first shopping container and based on an event within a predetermined zone for the first product and the product display;
   a memory storing location data for the first camera and location data for the second camera; and
   a processor analyzing the digital image data from the first camera, the digital image data from the second camera and the location data for the first camera and the location data for the second camera to determine that the first product has been taken from the product display and placed in the first shopping container.

2. The store camera system of claim 1, wherein the processor recognizes the first product and looks up a price for the first product in a price look-up database.

3. The store camera system of claim 2, wherein the processor adds the first product and the price to a transaction record associated with the first shopping container.

4. The store camera system of claim 3, wherein the system associates a customer with the first shopping container.

5. The store camera system of claim 3, wherein the transaction record includes an identification number for the first shopping container read from a visually identifiable tag on the first shopping container.

6. The store camera system of claim 1 further comprising a first large plurality of cameras having known locations and collectively generating digital image data for shopping containers throughout a store.

7. The store camera system of claim 6, wherein the processor tracks the first shopping container and generates tracking data as the first shopping container moves through the store.

8. The store camera system of claim 7, wherein the processor takes advantage of knowledge that from any given first camera the first shopping container has a limited number of nearest cameras which can next detect the first shopping container.

9. The store camera system of claim 7, wherein the processor associates the tracking data with a customer associated by the processor with the first shopping container.

10. The store camera system of claim 6 further comprising a second large plurality of cameras having known locations collectively generating digital image data for products arranged on product displays throughout the store.

11. The store camera system of claim 10, wherein the processor analyzes generated image data from the first and second large plurality of cameras to generate customer analytic data.

12. The store camera system of claim 1, wherein when the processor cannot recognize the first product with sufficient certainty, digital image data for the first product is flagged.

13. The store camera system of claim 12 further comprising a video display and wherein flagged digital image data is displayed on said video display for review by store personnel.

14. The store camera system of claim 13, wherein the video display is a touchscreen display and the store personnel manually enters identification data for the first product to a transaction record.

15. The store camera system of claim 1, wherein the processor determines the first shopping container has not moved from the first camera for a predetermined period of time and notifies store personnel whereby items from an abandoned first shopping container can be restocked in a timely manner.

16. The store camera system of claim 1, wherein the first camera comprises a digital capture device, a communication interface, memory, software and a high speed processor.

17. The store camera system of claim 16, wherein the memory of he first camera stores a first camera identifier.

18. The store camera system of claim 1, wherein the second camera comprises a digital capture device, a communication interface, memory, software and a high speed processor.

19. The store camera system of claim 18 further comprising a planogram database storing data associating the first product and the product display.

20. The store camera system of claim 19, wherein the processor retrieves data associating the first product and the product display and downloads said retrieved data to the memory of the second camera, and the high speed processor of the second camera employs said downloaded data in evaluating digital image data generated by the second camera.

* * * * *